March 3, 1959

H. EBERT 2,875,701

HYDROSTATIC PISTON ENGINE

Filed Aug. 30, 1954

INVENTOR
Heinrich Ebert
By
Patent Agent

March 3, 1959

H. EBERT 2,875,701

HYDROSTATIC PISTON ENGINE

Filed Aug. 30, 1954

INVENTOR
Heinrich Ebert

United States Patent Office 2,875,701
Patented Mar. 3, 1959

2,875,701

HYDROSTATIC PISTON ENGINE

Heinrich Ebert, Furth, Bavaria, Germany

Application August 30, 1954, Serial No. 453,002

Claims priority, application Germany August 31, 1953

3 Claims. (Cl. 103—162)

The present invention relates to hydrostatically working piston engines which in each of two cylindrical drums comprises the same number of more or less axially arranged pistons which work in opposite direction to each other upon a drive shaft, while the axes of the rotating cylinder drums define an angle with each other which angle may be fixed or variable. With such an arrangement, the piston power components acting upon the bearings of the drive shaft in the direction of the axis of the drive shaft, and the movement vectors resulting from the piston forces and effective perpendicular to the axis of the drive shaft are completely or nearly completely balanced or zero.

With piston engines of this type which are used as hydrostatic pumps or as hydrostatic motors and in which the two drums are controlled or arranged parallel to each other with regard to the working fluid delivered thereby or received by them, the cylinder chambers of the individual drums are each controlled by a control level in a manner known per se from the pressure side toward the suction side.

In connection herewith, especially with high pressure engines, undesirable shocks are exerted upon the bearings for the drive shaft and upon the reciprocating drive shaft. This is due to the fact that the changeover of two oppositely working pistons from the suction side to the pressure side and vice versa is not effected at precisely one and the same time in view of inaccuracies of the control edges of the two piston drums and their two control levels.

It is, therefore, an object of the present invention to provide a hydrostatic piston engine which will overcome the above-mentioned drawbacks.

It is another object of this invention to provide a hydrostatic piston engine which will avoid the occurrence of undesirable shocks upon the drive shaft and the bearings therefor.

It is still another object of this invention to provide a hydrostatic piston engine of the above-mentioned type which will allow the manufacture of such engines with less precision and therefore at a lower cost while, at the same time, being free from any material shocks during operation.

These and other objects and advantages of the invention will appear more clearly from the following specification in connection with the accompanying drawings, in which.

General arrangement

In order to overcome the above-mentioned drawbacks, according to the present invention, the working fluid chambers in the cylinder drums of each two cooperating pistons are connected with each other, independently of the control, through bores in the piston bottoms, connecting rods and flanges of the driving shaft so that the respective first closing or opening control side brings about the power shift of two oppositely acting pistons at precisely one and the same time.

Hydrostatic piston engines are known in which the working fluid, when being discharged, is not discharged through the control level but through bores in the piston and connecting rods. With these machines, the cylinder chambers of each two co-axial pistons of the two piston drums do not move in opposite direction to each other, and at no time will said cylinder chambers be subjected to the same pressure. Therefore, they must not be interconnected through bores in the pistons and connecting rods. With the known machines, the bores of the two co-axial pistons are, therefore, permanently separated from each other by ball joints and the swash plate intermediate the pistons. With the piston engine according to the invention, in those instances in which the pistons of the second drum are employed more or less merely for balancing the axial power components and, if at all, deliver a small quantity only of working fluid, the second control level is omitted and the pistons of the two cylindrical drums are also controlled by the first control level through connecting bores according to the invention.

Structural arrangement

Figure 1:
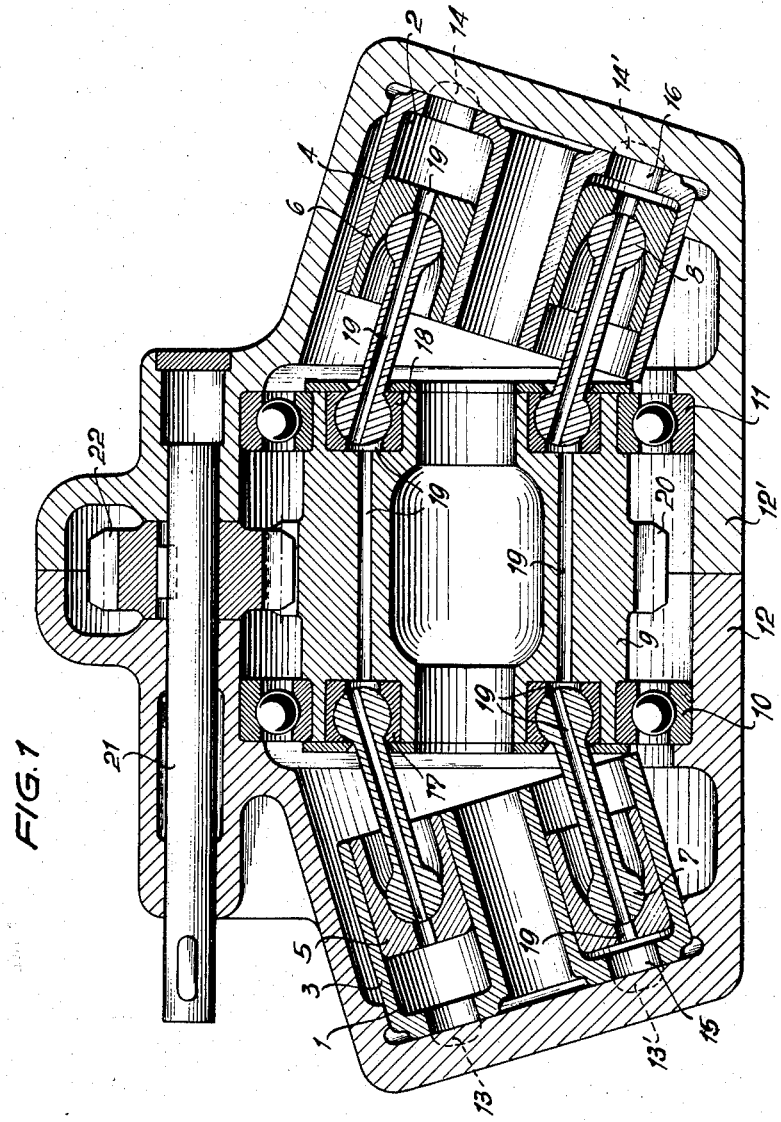
Fig. 1 illustrates a section through a piston engine according to the invention.

Referring now to the drawings in detail and to Fig. 1 thereof in particular, the cylinder bores 1 and 2 of the drums 3 and 4 have axially reciprocally mounted therein pistons 5 and 6. These pistons 5 and 6 act upon the drive shaft 9 through connecting rods 7 and 8 and their ball joint connections with said drive shaft 9.

The drive shaft 9 is rotatably mounted in the bearings 10 and 11. The bearings are within the casing halves 12 and 12' so inserted or placed upon the drive shaft that they prevent movement of the drive shaft in axial direction. The casing halves have their ends designed as control levels in a manner known per se and, consequently, are provided with kidney shaped apertures 13 and 13' and 14 and 14' not shown in view but only indicated in section by means of dash lines. The recesses 13 and 14 arranged behind the plane of the drawing may be assumed to be connected with the pressure conduit, and the recesses 13' and 14' located in front of the drawing plane may be assumed to be connected with the suction line. By means of these recesses, the cylinder bores 1 and 2 communicate with the pressure conduit and thus act as pressure chambers when they occupy the position shown in Fig. 1 during rotation of the drums 3 and 4. The said drums are rotatably mounted on the control level and in the casing halves. The bores 1 and 2 change over, i. e. act as suction chambers when during rotation of said drums the bores 1 and 2 communicate with the passages 15 and 16 arranged at the end of each cylinder bore in the bottom of the drum 5. To this end, the drums are connected with the drive shaft through synchronous joints of a known type (not shown in the drawings) so that they are likewise rotated by the drive shaft.

The two axes of the drums confine an angle which in the position shown in the drawing is approximately 30°. The ball heads of the connecting rods are adjacent the pistons journaled directly in the pistons, whereas adjacent the drive shaft 9 the ball heads of the connecting rods rest in corresponding ball sockets 17 and 18. According to the invention, the pistons as well as the connecting rods and ball sockets and the drive shaft are provided with bores 19, 19a, 19b, 19c so that the cylinder bores 1 and 2 of each two oppositely located and cooperating pistons are in continuous communication with each other.

The forces exerted by the pistons of two oppositely located cylinder bores, therefore, change stroke-like at the same time when shifting from the suction side to the pressure side. This stroke-like change, at the same time, is completely independent of whether or not the one control side is shifted earlier or later and vice versa so that when the axial components of the piston forces in the direction of the axis of the drive shaft are substantially balanced, larger unbalanced forces cannot act upon the drive shaft, and cannot do so even temporarily.

According to the embodiment shown in the drawings, the drive shaft 19 is provided with teeth 20 meshing with the gear 22 keyed to the input or output shaft 21. The shaft 21 is rotatably journaled in corresponding bores of the casing halves 12 and 12' which are screwed together in a convenient manner not shown in the drawing.

Figure 2:
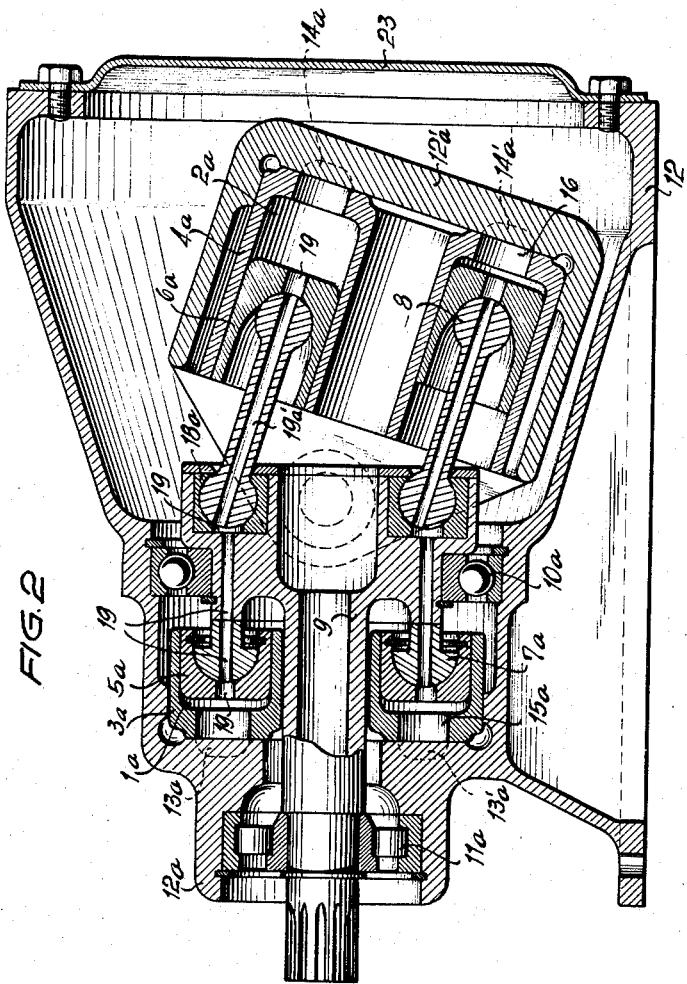
Fig. 2 is a further embodiment of a piston engine according to the invention, said piston engine being shown in section.

The embodiment of the piston engine according to the invention as illustrated in Fig. 2 differs from that of Fig. 1 primarily in that the drum 3a is concentric with regard to the drive shaft 9a, while the drum 4a is arranged on a frame 12'a and is pivotally supported together with the latter.

Also according to this embodiment, the drum 3a is rotatably journaled upon the control level provided in the casing 12a and is also rotatably journaled in the casing 12a. The drum 3a is also rotated by the drive shaft 9a extending therethrough and through the intervention of a follow-up pin not shown in the drawing. Consequently, also in this instance, similar to that of Fig. 1, the cylinder bores 1a can through the intervention of the recesses 13a and 13'a and the passages 15a at the end of each cylinder bore in the drum bottom alternately shift from the pressure side to the suction side and from the suction side to the pressure side. Inasmuch as with such a movement the pistons 5a need hardly move, because they are actuated less for feeding working fluid than merely for balancing the forces, the pistons 5a are relatively short. For the same reason, the connecting rods 7a journaled in the pistons 5a have only one end provided with a semi-spherical head, whereas the other side of said piston rods has been ground plane and acts directly upon the drive shaft 9a. The drive shaft 9a is merely prevented from moving in axial direction by the bearing 10a, whereas the bearing 11a is designed as roller bearing. The drive shaft 9a, as mentioned above, extends through the drum 3a so that it can be driven directly from the outside.

In contrast thereto, the right-hand drum, including the pistons thereof, connecting rods, and ball sockets, is designed precisely in the same manner as in Fig. 1. Instead of being rotatably journaled in the fixed casing half 12', however, it is rotatably journaled upon a tiltable frame 12'a while it is driven by the drive shaft 9a through the intervention of synchronous joints not shown in the drawing. The recesses 14'a are, also with this tilting arrangement, in a manner known per se in communication with the recesses 13'a and the pressure conduit, while the recess 14'a communicates with the recess 13'a and the suction line.

According to the invention, also in this instance, the pistons 5a and 6a, the connecting rods 7a and 8a, the ball sockets 18a and the drive shaft 9a are provided with bores 19'a so that also in this instance the cylinder bores 1a and 2a of each two oppositely located and cooperating pistons continuously communicate with each other through the bores in said connecting rods, ball sockets, and drive shaft whereby the intended effect can be obtained.

Inasmuch as in this instance the pistons 5a merely serve for balancing the forces in order to relieve the bearing 10a in axial direction, and in this capacity practically do not feed any working fluid, no liquid has to flow through the passages 15a and recesses 13a or 13'a. If bores 19'a are provided in this instance, any connection of the recesses 13a or 13'a with the pressure or suction conduit may also be omitted, which means a considerable simplification of the manufacturing process.

In addition to the above, even the apertures or recesses 13a, 13'a may be omitted and, if desired, according to the invention, also the passages 15a may be replaced by smaller bores if instead thereof on that side of the drum bottom of the drum 3a which faces the control level cut-outs are provided of lower depth, said cut-outs being equivalent to the above-mentioned passages as far as the size of the area is concerned.

The control or shifting of the cylinder chambers 1a and 2a from the pressure to the suction side and vice versa therefore can be effected only from one side, i. e., from the control or controlling surface of the drum 4.

It is, of course, understood that the present invention is by no means limited to the particular structures shown in the drawings but also comprises any modifications within the scope of the appended claims.

What I claim is:

1. In combination in a hydrostatic piston engine: two oppositely located drums, each of said drums comprising the same number of cylinders, and each of said cylinders having a piston reciprocable therein in substantially axial direction of the respective cylinder and confining with said piston a cylinder chamber, a rotatable drive shaft gearing for driving said drive shaft comprising a gear around and fixed to said drive shaft, piston rods respectively drivingly connecting each of the pistons of each of said drums with said shaft and said piston rods and said pistons being provided with passage means therethrough in axial direction thereof, each piston of one drum being located opposite to a piston of the other drum and forming therewith a pair of counter-running pistons, the cylinder chambers of one drum continuously communicating with the corresponding cylinder chamber adjacent the respective opposite piston of the other drum through the respective passage means in said shaft and in the respective oppositely located pistons and in the piston rods pertaining thereto, casing means rotatably supporting said drums, and passage means provided in said casing means and arranged for connection with a pressure conduit and a suction conduit respectively, and additional passage means for respectively effecting communication of the said cylinders with the passage means in said casing means.

2. In combination in a hydrostatic piston engine: two oppositely located drums, each of said drums comprising the same number of cylinders having a passage through the bottom thereof, a plurality of pistons respectively reciprocably mounted in said cylinders, a rotatable drive shaft, piston rods respectively drivingly connecting each of the pistons of each of said drums with said shaft and said shaft, said piston rods and said pistons being provided with bores therethrough in axial direction thereof, each of said pistons of one drum being located opposite to a piston of the other drum and forming therewith a pair of counter-running pistons, and casing means respectively rotatably housing said drums and being provided with cut-outs arranged for communication with said passage means and adapted respectively to be connected with a pressure conduit and a suction conduit, each cylinder confining with the piston reciprocable therein a cylinder chamber, the cylinder chambers of one drum respectively continuously communicating with the cylinder chambers adjacent the respective opposite pistons of the other drum through the respective bores in said shaft and in the oppositely located pistons and in the piston rods pertaining thereto.

3. In combination in a hydrostatic piston engine: two oppositely located drums, each of said drums comprising the same number of cylinders, and each of said cylinders having a piston reciprocable therein in substantially axial direction of the respective drum and confining with said piston a cylinder chamber, a rotatable drive shaft, piston rods respectively drivingly connecting each of the pistons of each of said drums with said shaft, said shaft and said piston rods and said pistons being provided with passage means therethrough in axial direction thereof, the arrangement being such that each piston of one drum is located opposite to a piston of the other drum and forms therewith a pair of counter-running pistons, the cylinder chambers of one drum respectively continuously communicating with the corresponding cylinder chambers adjacent the respective opposite pistons of the other drum through the respective passage means in said shaft and in the respective oppositely located pistons and in the piston rods pertaining thereto, each of said cylinders having a bottom and a bore through said bottom and being provided with a recess on the outside of said bottom, and casing means respectively rotatably supporting said drums, said recesses being arranged for respective communication with a pressure conduit and with a suction conduit.

References Cited in the file of this patent

UNITED STATES PATENTS

| | | |
|---|---|---|
| 1,996,889 | Thomas | Apr. 9, 1935 |
| 2,192,539 | Condon | Mar. 5, 1940 |
| 2,241,701 | Doe | May 13, 1941 |
| 2,250,512 | Vickers | July 29, 1941 |
| 2,353,802 | Zimmermann | July 18, 1944 |
| 2,364,301 | MacNeil | Dec. 5, 1944 |
| 2,453,128 | Hautzenroeder | Nov. 9, 1948 |
| 2,463,299 | Nixon | Mar. 1, 1949 |
| 2,737,894 | Ferris | Mar. 13, 1956 |
| 2,779,296 | Dudley | Jan. 29, 1957 |

FOREIGN PATENTS

| | | |
|---|---|---|
| 337,351 | Great Britain | Oct. 27, 1930 |
| 563,335 | Great Britain | Aug. 9, 1944 |